United States Patent
Aikawa

(10) Patent No.: US 6,756,819 B2
(45) Date of Patent: Jun. 29, 2004

(54) SYNCHRONIZATION CIRCUIT

(75) Inventor: Makoto Aikawa, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 17 days.

(21) Appl. No.: 10/307,402

(22) Filed: Dec. 2, 2002

(65) Prior Publication Data

US 2003/0107407 A1 Jun. 12, 2003

(30) Foreign Application Priority Data

Dec. 12, 2001 (JP) .......................................... 2001-378061

(51) Int. Cl.$^7$ .......................... H03K 19/00; H03L 7/06
(52) U.S. Cl. .......................... 326/93; 326/94; 327/155; 327/198; 375/354
(58) Field of Search .................. 326/93–95; 327/141, 327/144, 155, 198; 375/354

(56) References Cited

U.S. PATENT DOCUMENTS 5,539,786 A * 7/1996 Snelgrove .................... 375/373
5,974,102 A * 10/1999 Eo et al. ....................... 375/354
6,002,733 A * 12/1999 Kim ............................ 375/377
6,545,508 B2 * 4/2003 Senba .......................... 327/20

* cited by examiner

Primary Examiner—James Cho
(74) Attorney, Agent, or Firm—Volentine Francos, PLLC

(57) ABSTRACT

A synchronous circuit comprising a first flip-flop which has a first clock input terminal inputting an input signal, a first output terminal outputting a first output signal based on the input signal, a second output terminal outputting a second output signal based on the input signal and a first data input terminal inputting the second output signal; a second flip-flop which has a second clock input terminal inputting a clock signal, a reset terminal inputting a reset signal, a third output terminal outputting a third output signal based on the clock signal and the reset signal, a fourth output terminal outputting a fourth output signal based on the clock signal and the reset signal and a second data input terminal inputting the fourth output signal; a third flip-flop which has a third clock input terminal inputting the third output signal of which voltage level is reversed, a fifth output terminal outputting a fifth output signal based on the reversed third output signal, a sixth output terminal outputting a sixth output signal based on the reversed third output signal and a third data input terminal inputting the sixth output signal; and a logical circuit which generates the reset signal using the first output signal and the fifth output signal.

4 Claims, 2 Drawing Sheets

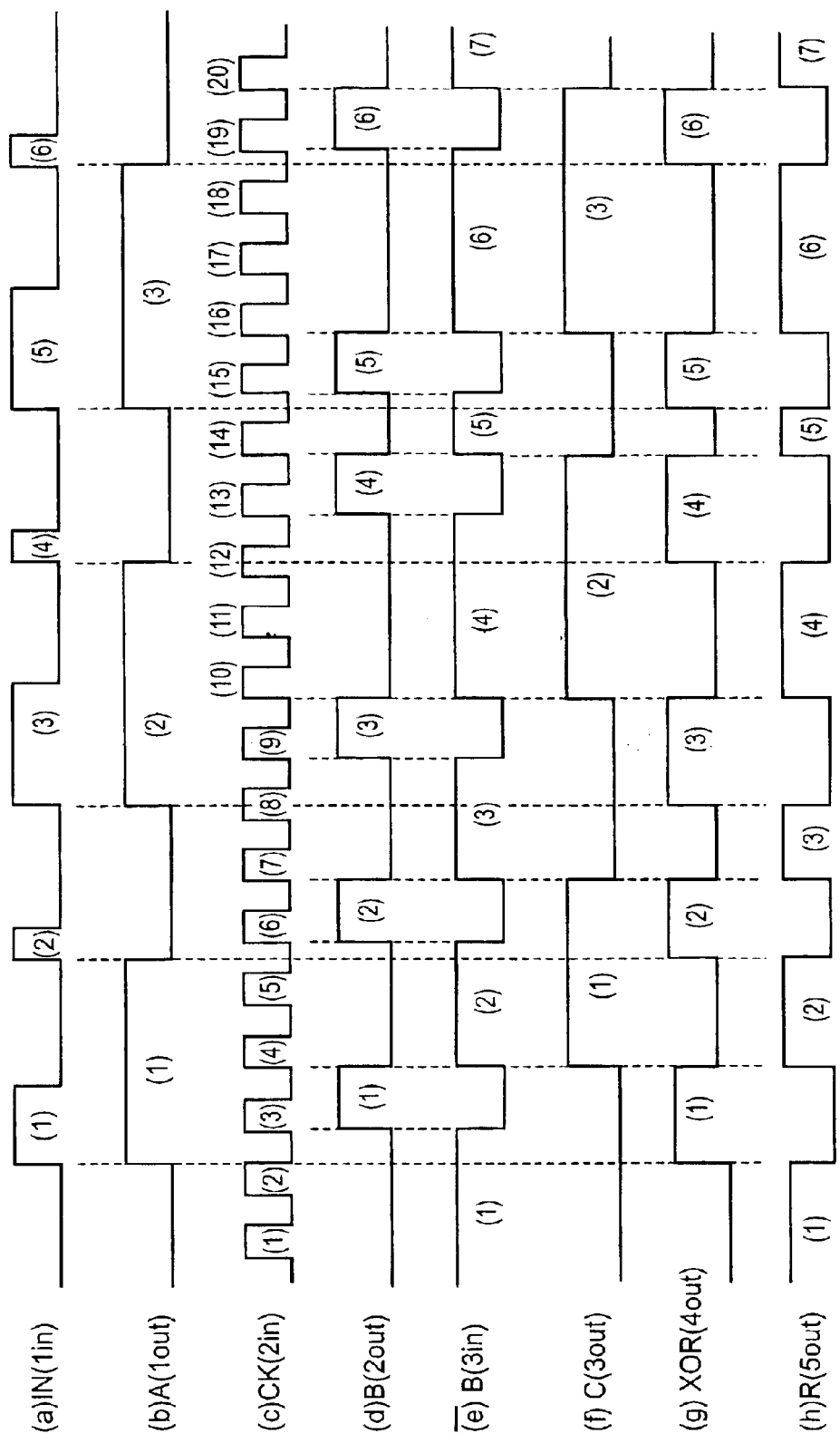

SYNCHRONIZATION CIRCUIT

BACKGROUND OF THE INVENTION

1. Field of the Invention

The present invention relates, in general, to a synchronization circuit and, more particularly, to a circuit aligning the pulses of an input signal with those of a clock.

This application is a counterpart of Japanese patent application, Serial Number 378061/2001, filed Dec. 12, 2001, the subject matter of which is incorporated herein by reference.

2. Description of Related Art

When a signal is transferred between equipment which are located with a long distance each other, there the following situations occur occasionally. One is that duty rate of the pulses of the input signal is smaller than those of the clock signal. The other is that duty rate of the pulses of the input are not constant. Another is that the speed of the input signal is unstable because the pulses are not comprised at even intervals. To solve the above problem, the input signal is sampled using the clock signal of which frequency is higher than of the input signal. However, when the input signal has high frequency as the clock signal, there are times when a part of the pulse of the input signal is lack at sampling. The conventional synchronization circuit, Japanese Patent Application Laid Open No. 11-331137 (corresponding to European patent application publication No. EP 0942533A2), provides the circuit for solving the above problem.

However, the conventional circuit requires connecting with two flip-flops in series which are provided a common clock signal, in order to avoid a metastable state. The metastable state occurs in a state that the clock raises or falls before passing a setup time or hold time for the data of the flip-flop. Therefore, the conventional circuit requires four flip-flops which are connected in series.

SUMMARY OF THE INVENTION

According to one aspect of the present invention, there is provided a synchronous circuit comprising a first flip-flop which has a first clock input terminal inputting an input signal, a first output terminal outputting a first output signal based on the input signal, a second output terminal outputting a second output signal based on the input signal and a first data input terminal inputting the second output signal, a second flip-flop which has a second clock input terminal inputting a clock signal, a reset terminal inputting a reset signal, a third output terminal outputting a third output signal based on the clock signal and the reset signal, a fourth output terminal outputting a fourth output signal based on the clock signal and the reset signal and a second data input terminal inputting the fourth output signal, third flip-flop which has a third clock input terminal inputting the third output signal of which voltage level is reversed, a fifth output terminal outputting a fifth output signal based on the reversed third output signal, a sixth output terminal outputting a sixth output signal based on the reversed third output signal and a third data input terminal inputting the sixth output signal, and a logical circuit which generates the reset signal using the first output signal and the fifth output signal.

The novel features of the invention will more fully appear from the following detailed description, appended claims and the accompanying drawings.

BRIEF DESCRIPTION OF THE DRAWINGS

FIG. 2 is an operational diagram showing a synchronization circuit according to a first preferred embodiment of the present invention.

DETAILED DESCRIPTION OF THE PREFERRED EMBODIMENTS

Figure 1:
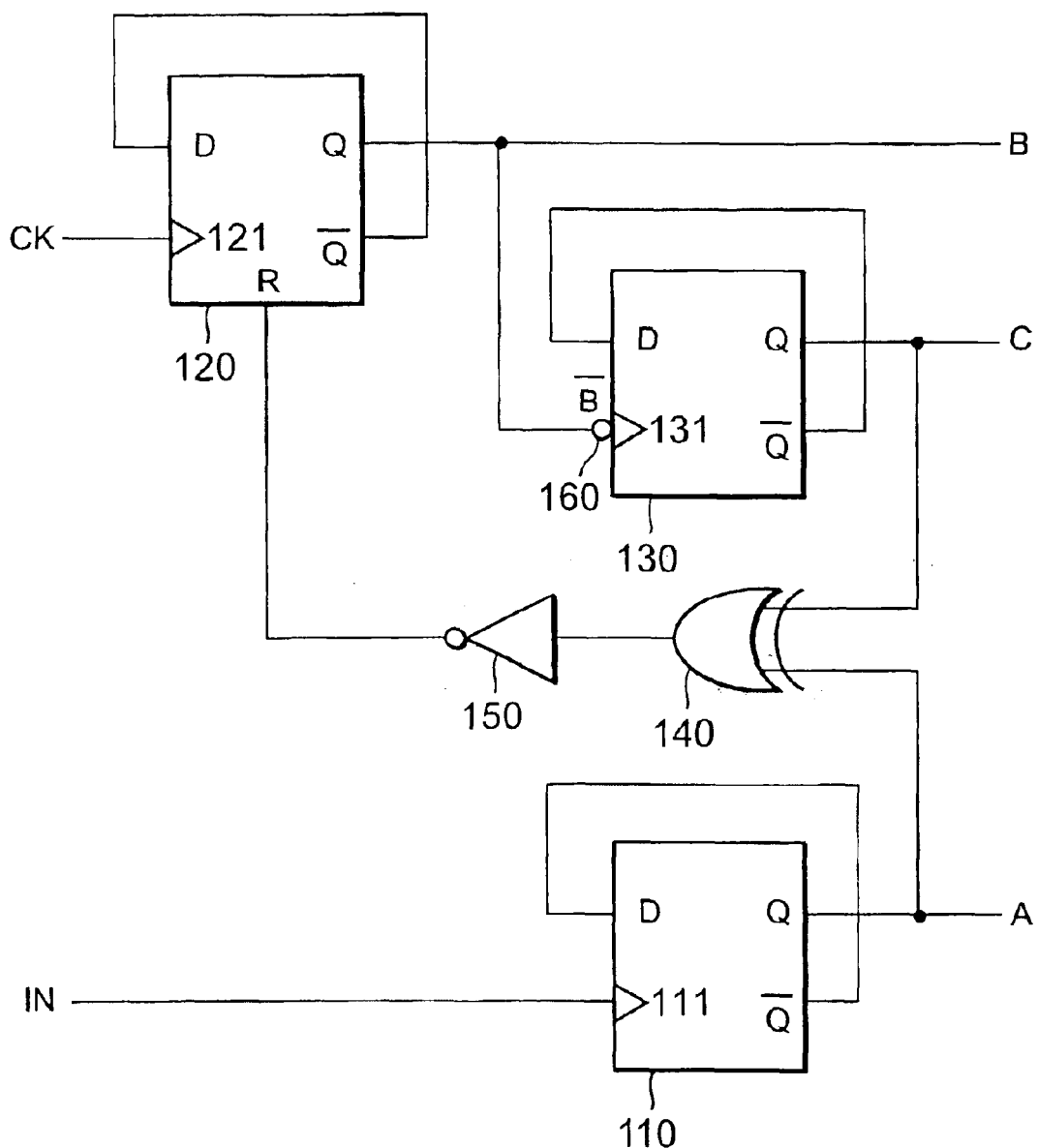
FIG. 1 is a block diagram showing a synchronization circuit according to a first preferred embodiment of the present invention.

A synchronization circuit of the present invention will be explained with the preferred embodiment of the present invention.

A synchronization circuit according to a preferred embodiment of the present invention will be described with reference to FIGS. 1–2. FIG. 1 is a block diagram showing a synchronization circuit according to the preferred embodiment of the present invention. FIG. 2 is an operational diagram showing a synchronization circuit according to the preferred embodiment of the present invention.

First, the composition of the synchronization circuit according to the preferred embodiment of the present invention will be explained with FIG. 1. The synchronization circuit, as shown in FIG. 1, has the toggle type flip-flops 110, 120, 130, an exclusive-OR circuit 140 and the inverters 150, 160. The toggle type flip-flop is a logical circuit which outputs an output signal of which the voltage level is changed based on the rising edge or the falling edge of an input signal. For example, when the toggle type flip-flop is input a sine wave, it outputs the output signal of which the frequency is half of the sine wave. Therefore, the toggle type flip-flop is used as a divider.

The toggle type flip-flop (a first flip-flop) 110 is input a digital signal IN (input signal). The flip-flop 110 outputs an output signal A of which the voltage level is alternatively changed according to the rising edge of the pulse of the digital signal IN. The flip-flop 110 has a data input terminal D, an output terminal Q, a reverse output terminal Q-bar and a clock input terminal 111. The data input terminal D is connected with the reverse output terminal Q-bar. The data input terminal D is input a reversed output signal which is output by the reverse output terminal Q-bar. The output terminal Q is connected with one input terminal of the exclusive-OR circuit 140. An output signal A is output through the output terminal Q to one input terminal of the exclusive-OR circuit 140. The is clock input terminal 111 is input the digital signal IN.

The toggle type flip-flop (a first flip-flop) 120 is input the pulse of a clock signal CK. The flip-flop 120 outputs an output signal B of which the voltage level is alternatively changed according to the rising edge of the pulse of the clock signal CK. The flip-flop 120 has a data input terminal D, an output terminal Q, a reverse output terminal Q-bar, an asynchronous reset input terminal R and a clock input terminal 121. The data input terminal D is connected with the reverse output terminal Q-bar. The data input terminal D is input a reversed output signal which is output by the reverse output terminal Q-bar. The output terminal Q is connected with an input terminal of the inverter 160. An output signal B is output through the output terminal Q to the input terminal of the inverter 160. The output signal B is an output signal of the synchronization circuit of the present invention. The asynchronous reset input terminal R is connected with an output terminal of the inverter 150. The asynchronous reset input terminal R is input a reset signal which is output by the inverter 150. The output signal B having the voltage level of the supply voltage is not output by the flip-flop 120, when the reset signal having the voltage level of the supply voltage is input. The clock input terminal 121 is input the clock signal CK.

The toggle type flip-flop (a first flip-flop) 130 is input an output signal B-bar reversing the pulses of the output signal B by the inverter 160. The flip-flop 130 outputs an output signal C of which the voltage level is alternatively changed according to the falling edge of the pulse of the output signal B. In other words, the flip-flop 130 outputs the output signal C of which the voltage level is alternatively changed according to the rising edge of the pulse of the output signal B-bar. The flip-flop 130 has a data input terminal D, an output terminal Q, a reverse output terminal Q-bar and a clock input terminal 131. The data input terminal D is connected with the reverse output terminal Q-bar. The data input terminal D is input a reversed output signal which is output by the reverse output terminal Q-bar. The output terminal Q is connected with the other input terminal of the exclusive-OR circuit 140. An output signal C is output through the output terminal Q to the other input terminal of the exclusive-OR circuit 140. The clock input terminal 131 is input the output signal B-bar reversing the pulses of the output signal B by the inverter 160.

The exclusive-OR circuit 140 has two input terminals and one output terminal. One input terminal is connected with the output terminal Q of the flip-flop 110 and is input the output signal A. The other input terminal is connected with the output terminal Q of the flip-flop 130 and is input the output signal C. The output terminal is connected with the input terminal of the inverter 150. The exclusive-OR circuit 140 outputs a signal having the voltage level of the supply voltage ("H" level), if either the output signals A or C each having the voltage level of the supply voltage is input but not both. The exclusive-OR circuit 140 outputs the signal having the voltage level of the ground voltage ("L" level), if not. In addition, as shown in FIG. 2(D), the pulse width of the output signal B is equal to each other.

The inverter 150 has an input terminal and an output terminal. The input terminal is connected with the output terminal of the exclusive-OR circuit 140. The output terminal is connected with the asynchronous reset input terminal R of the flip-flop 120. The inverter 150 is input the signal output by the exclusive-OR circuit 140 and reverses the pulses of the input signal. The inverter 150 outputs the reversed input signal to the asynchronous reset input terminal R of the flip-flop 120 as the reset signal.

The inverter 160 has an input terminal and an output terminal. The input terminal is connected with the output terminal Q of the flip-flop 120. The output terminal is connected with the clock input terminal 131 of the flip-flop 130. The inverter 160 is input the output signal B output by the flip-flop 120 and reverses the pulses of the output signal B. The inverter 160 outputs the reversed output signal B to the clock input terminal 131 of the flip-flop 130 as the output signal B-bar.

Next, an operation of the synchronization circuit according to the preferred embodiment of the present invention will be explained with FIG. 2.

FIG. 2(A) shows a wave form of the digital signal IN. As shown in FIG. 2(A), the duty rate of the digital signal IN is not constant. To be concrete, each pulse width of the pulses (1)–(6) is different from each other. In addition, the frequency of the digital signal IN is near to the frequency of the clock signal CK shown in FIG. 2(C). To be concrete, the pulse width of the pulse (2) shown in FIG. 2(A) is approximately equal to the pulse width of the clock signal CK shown in FIG. 2(C).

FIG. 2(B) shows a wave form of the output signal A which is output by the flip-flop 110. As shown in FIG. 2(B), the pulses of the output signal A are changed in sync with the rising edge of the digital signal IN. In other words, the pulses of the output signal A have the rising edges or the falling edges alternatively every the rising edge of the digital signal IN. As shown in FIGS. 2(A) and 2(B), one pulse of the output signal A is formed every two pulses of the digital signal IN. To be concrete, the pulse (1) of the output signal A shown in FIG. 2(B) rises in sync with the rising edge of the pulse (1) of the digital signal IN shown in FIG. 2(A) and falls in sync with the rising edge of the pulse (2) of the digital signal IN.

FIG. 2(C) shows a wave form of the clock signal CK to be input the clock terminal 121 of the flip-flop 120. As shown in FIG. 2(C), the clock signal CK is the signal which has even intervals (constant frequency), even level and even duty rate and which is generated in a clock generator source.

FIG. 2(D) shows a wave form of the output signal B which is output by the flip-flop 120. The pulses of the output signal B are changed in sync with the rising edge of the clock signal CK. In other words, the pulses of the output signal B have the rising edges or the failing edges alternatively every the rising edge of the clock signal CK. The flip-flop 120 has the asynchronous reset input terminal R which is input the reset signal output by the inverter 150. The reset signal controls the changing the pulses of the output signal B. The output signal B having the voltage level of the supply voltage can be output, when the reset signal has the voltage level of the ground voltage ("L" level). To be concrete, as shown in FIGS. 2(C) and 2(H), the reset signal has the voltage level of the ground voltage ("L" level) from the falling edge of the pulse (2) of the clock signal CK to the rising edge of the pulse (4) of the clock signal CK. So, the pulse (1) of the output signal B shown in FIG. 2(D) rises in sync with the rising edge of the pulse (3) of the clock signal CK shown in FIG. 2(C) and falls in sync with the rising edge of the pulse (4) of the clock signal CK. Next, as shown in FIGS. 2(C) and 2(H), the reset signal has the voltage level of the supply voltage ("H" level) from the rising edge of the pulse (4) of the clock signal CK shown in FIG. 2(C) to between the pulses (5) and (6) of the clock signal CK. So, the output signal B does not rise or fall in sync with the rising edge of the pulse (5) of the clock signal CK shown in FIG. 2(C).

FIG. 2(E) shows a wave form of the output signal B-bar which is output by the inverter 160. This wave form is the wave form reversing the wave form of the output signal B output by the flip-flop 120. To be concrete, the pulse (1) of the output signal B shown in FIG. 2(D) has the voltage level of the supply voltage ("H" level). So, the output signal B-bar has the voltage level of the ground voltage ("L" level).

FIG. 2(F) shows a wave form of the output signal C which is output by the flip-flop 130. The pulses of the output signal C are changed in sync with the rising edge of the output signal B-bar (or in sync with the falling edge of the output signal B). In other words, the pulse of the output signal C has the rising edges or the falling edges alternatively every the rising edge of the output signal B-bar (or every the falling edge of the output signal B). To be concrete, the pulse (1) shown in FIG. 2(F) rises in sync with the rising edge of the pulse (2) of the output signal B-bar shown in FIG. 2(E) and falls in sync with the rising edge of the pulse (3) of the output signal B-bar. To put it differently, the pulse (1) shown in FIG. 2(F) rises in sync with the falling edge of the pulse (1) of the output signal B shown in FIG. 2(D) and falls in sync with the falling edge of the pulse (2) of the output signal B.

FIG. 2(G) shows a wave form of the output signal which is output by the exclusive-OR circuit 140. The exclusive-OR circuit 140 outputs a signal having the voltage level of the supply voltage ("H" level), if either the output signals A or C each having "H" level is input but not both. To be concrete, the pulse (1) shown in FIG. 2(G) rises in sync with the rising edge of the pulse (1) of the output signal A shown in FIG. 2(B) and falls in sync with the rising edge of the pulse (1) of the output signal C shown in FIG. 2(F). Correspondingly, the pulse (2) shown in FIG. 2(G) rises in sync with the falling edge of the pulse (1) of the output signal A shown in FIG. 2(B) and falls in sync with the falling edge of the pulse (1) of the output signal C shown in FIG. 2(F). By the way, as shown in FIGS. 2(A), 2(D) and 2(G), the output signal output by the exclusive-OR circuit 140, the digital signal IN and the output signal B have the following relationship. The output signal which is output by the exclusive-OR circuit 140 has the voltage level of the supply voltage ("H" level) from time that the digital signal IN rises to time that the output signal B falls.

FIG. 2(H) shows a wave form of the output reset signal which is output by the inverter 150. This wave form is the wave form reversing the wave form of the output signal output by the exclusive-OR 140. To be concrete, the pulse (1) of the output signal shown in FIG. 2(G) has the voltage level of the ground voltage from the falling edge of the pulse (1) of the output signal to the rising edge of the pulse (2) of the output signal, so the pulse (2) of the reset signal shown in FIG. 2(H) has the voltage level of the supply voltage. The flip-flop 120 does not output the output signal B having the voltage level of the supply voltage ("H" level) when the reset signal having the voltage level of the supply voltage ("H" level) is input through the asynchronous reset input terminal R.

The synchronization circuit according to the preferred embodiment of the present invention can output the output signal B which is one-shot pulse having the voltage level of the supply voltage per inputting the digital signal which is one pulse having the voltage level of the supply voltage. Therefore, the synchronization circuit according to the preferred embodiment of the present invention can output the signal which synchronizes with the clock signal without lacking the input pulse, when the duty rate of the input signal is not constant and when the frequency of the input signal is near to the frequency of the clock signal. In addition, the synchronization circuit according to the preferred embodiment of the present invention does not need two flip-flops which are connected in series in order to avoid metastable state. Furthermore, the synchronization circuit according to the preferred embodiment of the present invention can reduce the number of the flip-flops to three and simplify the connection with the clock signal, because it does not need the same clock signal which is provided each flip-flop.

While the preferred form of the present invention has been described, it is to be understood that modifications will be apparent to those skilled in the art without departing from the spirit of the invention. For example, the flip-flop 120 and the inverter 150 are individually provided. However, the inverter 150 may be built-in the asynchronous reset input terminal R of the flip-flop 120. Furthermore, the inverter 160 is attached to the clock terminal 131 of the flip-flop 130. However, the inverter 160 may be provided individually such as the inverter 150. The scope of the invention, therefore, is to be determined solely by the following claims.

What is claimed:

1. A synchronization circuit comprising;
    a first flip-flop which has a first clock input terminal inputting an input signal, a first output terminal outputting a first output signal based on the input signal, a second output terminal outputting a second output signal based on the input signal and a first data input terminal inputting the second output signal;
    a second flip-flop which has a second clock input terminal inputting a clock signal, a reset terminal inputting a reset signal, a third output terminal outputting a third output signal based on the clock signal and the reset signal, a fourth output terminal outputting a fourth output signal based on the clock signal and the reset signal and a second data input terminal inputting the fourth output signal;
    a third flip-flop which has a third clock input terminal inputting the third output signal of which voltage level is reversed, a fifth output terminal outputting a fifth output signal based on the reversed third output signal, a sixth output terminal outputting a sixth output signal based on the reversed third output signal and a third data input terminal inputting the sixth output signal; and
    a logical circuit which generates the reset signal using the first output signal and the fifth output signal.

2. The synchronization circuit according to claim 1, wherein the logical circuit has
    an exclusive-OR circuit which has a first input terminal inputting the first output signal and a second input terminal inputting the fifth output signal and an output terminal outputting an exclusive-OR operation result based on the first output signal and the fifth output signal and
    a first inverter which has an input terminal inputting the exclusive-OR operation result and an output terminal outputting a reversed exclusive-OR operation result as the reset signal.

3. The synchronization circuit according to claim 2, further comprising;
    a second inverter which has an input terminal inputting the third output signal and an output terminal outputting the reversed third output signal to the third clock terminal.

4. A synchronization circuit comprising:
    a first flip-flop which outputs a first output signal and a second output signal based on the voltage level of an input signal, wherein the first output signal and the second output signal have different voltage level each other;
    a second flip-flop which outputs a third output signal and a fourth output signal based on the voltage level of a clock signal and a reset signal, wherein the third output signal and the fourth output signal have different voltage level each other;
    a third flip-flop which outputs a fifth output signal and a sixth output signal using the third output signal, wherein the fifth output signal and the sixth output signal have different voltage level each other; and
    a logical circuit which generates the reset signal using the first output signal and the fifth output signal.

* * * * *